United States Patent Office 3,072,172
Patented Jan. 8, 1963

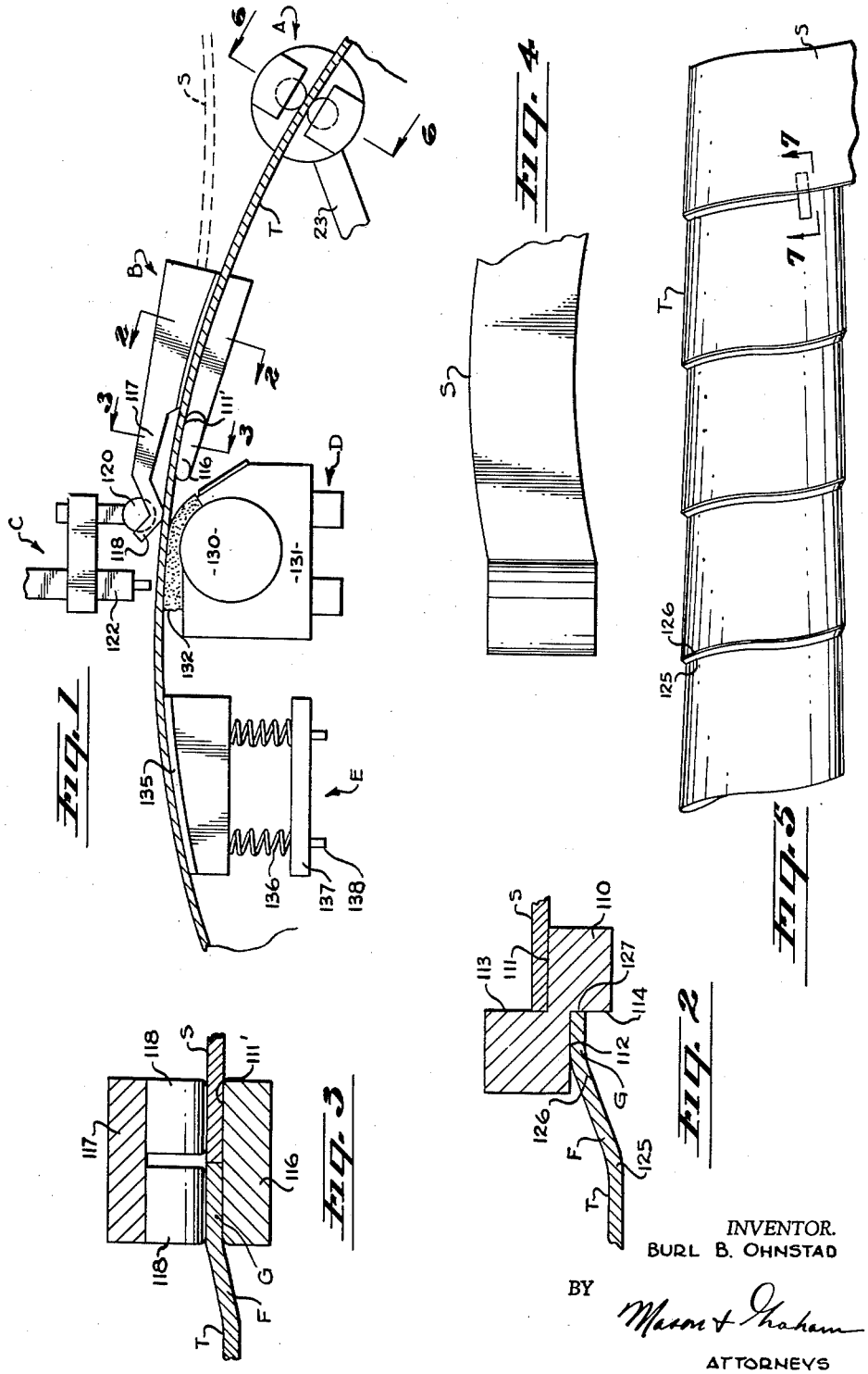

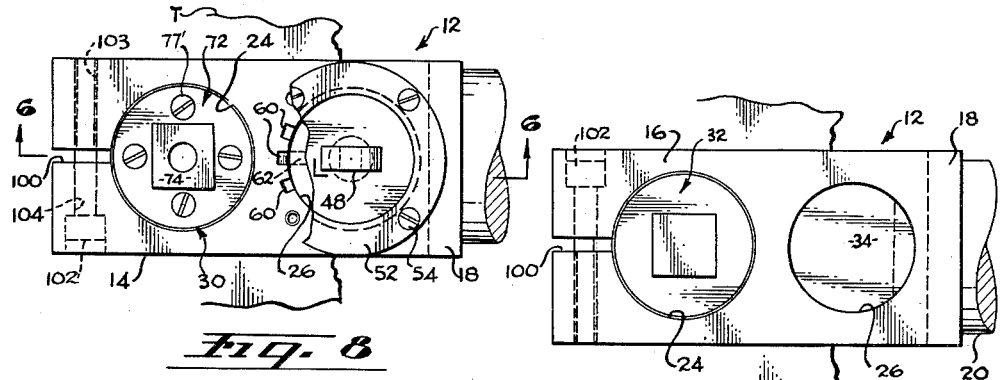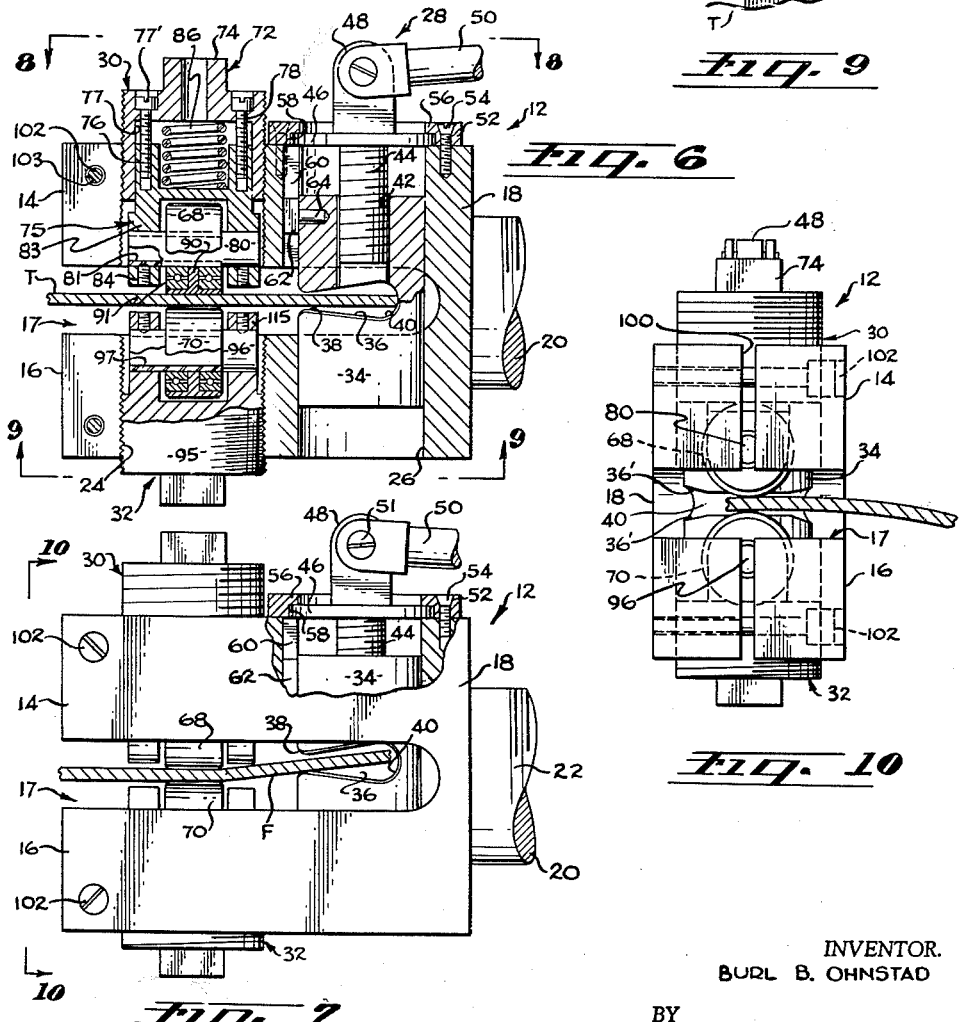

3,072,172
METHOD AND APPARATUS FOR POSITIONING EDGE PORTIONS IN BUTT-WELDING HELICAL SEAM TUBING
Burl B. Ohnstad, South Gate, Calif., assignor to American Pipe and Construction Co., South Gate, Calif., a corporation of Delaware
Filed May 4, 1959, Ser. No. 810,898
11 Claims. (Cl. 153—2)

This invention relates generally to the making of welded, helical seam cylindrical steel tubing from strip or skelp. More particularly, the invention relates to means for both vertically and horizontally aligning the skelp with the cylinder edge to which it is being welded in a continuous manner, and means for compensating for camber or uneven length edges of the skelp when present.

It is an object of the invention to provide novel means for adjusting or compensating for misaligned or uneven, cambered and/or otherwise distorted skelp so as to be usable, particularly in helical welding formation of tubing, in a continuous manner without greatly varying the diameter of the tube formed thereby and without the necessity of varying the angle of the skelp as it is fed to the cylinder.

An important purpose resides in the provision of improved means for positioning and aligning adjacent edges of both the formed cylinder and the incoming skelp jointly in welding position immediately prior to butt-welding thereof.

Another object is to provide a novel adjustable die adapted to bend a predetermined portion of one of said adjacent edges (preferably that of the cylinder) either up or down prior to welding so as to align it with the other edge. In addition, it is an object to provide such a die which serves also as a limit means for horizontal alignment of the cylinder edge.

Still another purpose is to provide novel adjustable, horizontal aligning means exemplified by slanted or angularly rotated, knurled, crowd rollers adapted to restrain against transverse displacement, or transversely move, the rotating cylinder edge to a skelp-aligned position, desirably in conjunction with a die of the type indicated.

Another object is to provide a novel heat-transferring, smoothing shoe disposed immediately posterior to the formed weld along the path of travel of the cylinder being formed.

Other objects and advantages of the invention will be apparent from the drawing and following description.

Referring to the drawings:

FIG. 1 is a transverse sectional view taken through an arc of a cylinder being formed by continuous welding of skelp to the edge thereof, with my several successive positioning devices shown somewhat schematically along the converging paths of travel of the cylinder and skelp;

FIG. 2 is a sectional view of the guide shoe taken along the line 2—2 of FIG. 1;

FIG. 3 is a vertical sectional view through the guide shoe on line 3—3 of FIG. 1;

FIG. 4 is a plan view of a roll of cambered skelp partially unrolled to show the opposing edges of unequal length;

FIG. 5 is a plan view of a cylinder formed of cambered skelp, particularly showing the edge bent weld which produced a cylinder of fluctuating but constant average diameter;

FIG. 6 is a sectional view on line 6—6 of FIG. 1 (and FIG. 8) of my composite edge-bending and horizontal positioning die means;

FIG. 7 is an elevational view partly in section on line 7—7 of FIG. 1 of the die means shown in FIG. 6 with the edge bending die elevated so as to turn up the moving cylinder edge;

FIGS. 8 and 9 are top and bottom plan views, respectively of the die means of FIG. 6, the views being designated by the lines 8—8 and 9—9 respectively of FIG. 6; and FIG. 10 is an end elevation of the same die means in the direction of the line 10—10 in FIG. 7, with a portion of the rotating cylinder wall broken away to show the curvature of the die jaw.

As seen in FIG. 4, a strip S of metal, such as steel, may be produced with its opposite edges of unequal length due to longitudinal curvature of the strip as a whole. If such a cambered strip were rolled helically into a tube and the edges welded together, the tube thus formed would not be a true cylinder but would have a progressively increasing or decreasing diameter. Accordingly, to avoid this, one of the two mating edges (conveniently the already formed tube) is bent before being welded to the other edge (i.e. the strip or skelp). Thus if the longer edge of skelp is being welded to what was previously the shorter edge, now forming the tube, the latter edge is bent radially outwardly to meet the skelp. The resulting tube still is not a true cylinder but its "average" diameter remains constant, even though fluctuating. Such metal tubes can be embedded in concrete to provide composite cylindrical pipe wherein the small fluctuations in diameter are of no consequence. In the drawings, the amount of edge-bending is exaggerated for purpose of better illustration. In practice the vertical bend seldom exceeds a fraction of an inch. However, it will be appreciated that this radial variation when extended along the indefinite length of a continuously forming tube, if uncorrected, would soon funnel it to a shape both difficult to handle and in most cases economically worthless.

Another problem of mating such cambered skelp arises from the need of horizontal aligning. Accordingly adjustment for both vertical bending and horizontal aligning are provided by one composite assembly of the present invention which provides a vertically adjustable edge bending die which simultaneously furnishes limit means along which the sliding edge abuts, there being mounted also in said assembly, adjustable angularly directed rollers to move or hold the moving edge laterally against the limit means. This edge-aligning assembly is conveniently applied to the already formed tube edge. Simultaneously the moving skelp edge is horizontally and vertically aligned therewith prior to moving the two, adjacent-held edges beneath a stationary welding head, such positioning being made by means of a combination of rollers and slide surfaces.

As seen in FIG. 1, the continuously forming tube T is rotated jointly with movement of the incoming skelp S which is fed (by means not shown) along a path to meet the tube. The tube, before meeting the skelp passes through the horizontal aligning and edge-bending assembly A which moves the tube edge into proper horizontal alignment (or if already aligned prevents regression of same) and, if necessary, bends the edge up or down the required amount to match the same with the mating edge of the skelp. The two edges then move through the composite guide shoe B which vertically aligns them before they are passed beneath a welding assembly C disposed above a supporting flux backup assembly D. The welded seam then passes over a copper shoe E. It is to be understood that the skelp and tube are driven and guided by conventional rollers and other means well known in the art which need not be illustrated. The roller and edge bending assembly A (FIGS. 6-10) is here described for convenience as generally vertically mounted, however, it will be appreciated that the assembly can be tilted to any convenient angle to accommodate any arcuate section of the formed cylinder, as seen particularly in FIG. 1.

The first unit of the invention is here embodied in an assembly A consisting of a generally rectangular, U-shaped housing 12 disposed with one arm 14 of the U vertically above the other 16 so as to define a generally horizontally disposed slot 17 therebetween, the connecting upright portion 18 of the U thus forming an inner terminus for the slot. Externally the housing is provided with a short neck or shaft portion 20 terminating in an annular externally threaded neck 22 for attachment to a suitable mounting arm 23 (FIG. 1) by means of which the angular disposition of the assembly to accommodate an arc of sheet metal, just described, may be readily effected.

The housing is formed with a pair of transversely aligned, generally parallel vertical bores 24, 26 extending through both U arms and spaced laterally apart therealong. Within the bore 26 closest the upright portion 18 of the U, is disposed a vertically adjustable edge-bending or crimping die 28, while within the outer parallel aperture 24 are mounted an inwardly opposing pair of angularly disposable, knurled crowd wheel or roller assemblies 30, 32 adapted jointly to frictionally engage the moving metal edge of the tube T and move or hold the same all the way within die 28.

The edge-bending die 28 is formed of a vertically disposed, externally smooth, cylindrical body 34 which is axially slidable in bore 26. The body is formed with a transverse slot 36 having a mouth 38 of somewhat greater width than the thickness of the metal of the cylinder edge. The slot 36 gradually increases in width inwardly of the mouth and is bounded at its inner end by abutment surface 40, along which the inwardly projected tube edge slidingly moves in edge abutment. The lateral marginal areas of the slot 36 are flared at 36'. It will be seen that by rotatably adjusting the body 34, the inner surface 40 can be disposed at an angle which will advance one end or the other of surface 40 closer to the open end of slot 17 and thus further limit movement of the edge of the cylinder.

The upper part of body 34 has a tapped bore 42 which threadedly receives a vertical, threaded pin 44. The latter has a flange 46 and an upper centrally projecting, apertured, flat sided boss 48 to which is attached a radially extending, operating handle or lever arm 50 by a screw or pin 51.

The bore 26 is restricted at its upper end by an annular cover plate 52 secured to the housing by screws 54. A radially inwardly projecting, annular flange 56 is disposed to overlie the upper face of the flange 46 of pin 44, the latter being thus seated in the inner peripheral groove 58 of the closure cap so as to rest upon the upper edge of the housing immediately adjacent the bore 26. The threaded pin 44 is thus restrained against longitudinal displacement while being free to be rotated by means of the handle 50.

A series of downward short longitudinally extending, radial slots 60 are formed along the upper margin of the bore 26, spaced apart a short distance circumferentially, e.g. 30° (FIG. 8). An axially elongated key 62 (FIG. 6) has a short radial mounting pin 64 fitted into a corresponding hole of the cylinder, so that when so mounted on the face of the cylinder, the latter may be locked against rotation by the key 62 being selectively inserted in any one of the three slots 60. This serves two purposes, first to prevent rotation of the cylinder in the bore so that it may be vertically moved by turning the screw 44, and secondly, to position the inner abutment surface 40 straight with, or at an angle to the edge of the tube T.

For the purpose of urging the edge of the tubing T into the slot 36 of member 34, which latter member may be termed a jaw, or for holding the same therein, I provide the pair of roller assemblies 30, 32 which have opposing knurled rollers 68, 70, respectively disposed to frictionally engage opposite sides of the edge portion of the tube as the latter moves between the rollers. The upper roller assembly 30 includes a tubular yoke housing member 72 which is formed with a centrally apertured, upwardly extending non-circular boss 74 shown as square in cross section. Member 72 is externally threaded to be received in the internally threaded bore 24. A yoke member 75 having a cylindrical upper portion 76 received in a cylindrical chamber 77 of member 72 is secured to the latter member by a series of screws 77 which freely pass through holes 78 in member 72 and thread into member 75. A roller mounting pin 80 having a sleeve 81 is mounted in the legs 83 of the yoke to mount the roller 68. Set screws 84 secure the pin and sleeve. A spring 86 serves to bias the members 72 and 75 apart and thereby yieldably urge the roller 68 into frictional engagement with the outer surface of the edge of tube T. The tension can be varied by adjustment of the screws 77'.

The roller 68 itself comprises a knurled shell 90, of T-shape in cross section, supported by a pair of ball bearings 91.

The lower roller assembly 32 comprises a yoke 95 having leg portions 115 in which is mounted a pin 96 having a sleeve 97 thereon to support the roller 70. By appropriate adjustment of the angle of the rollers 68 and 70, it will be apparent that the tube T which is being formed, and which, during such formation is both rotating to and moving axially from right to left as viewed in FIGS. 6 and 7, can be restrained against such axial movement and held in desired alignment by means of the rollers 68 and 70 rolling it into engagement with the surface 40 in the jaw member 34. In order to lock the rollers in adjusted position each of the arms 14 and 16 of the housing 12 are vertically slit at 100 from their outer ends inwardly to the bore 24 so that the members 72 and 95 can be locked against rotation by tightening transverse screw 102 which are threadedly mounted in threaded bores 103 and freely received in bores 104.

It will be apparent that with the assembly A, by appropriate adjustment of the jaw member 34, the edge portion of the tubing T, or a strip of metal as the case may be, can be bent either upwardly or downwardly as required and in FIG. 7 the member 34 has been shown in a position where it is elevated with respect to the position in which it is shown in FIG. 6 thereby producing an upward bend of the edge of the tubing T as shown.

After leaving assembly A, the edge of the tube moves to the guide shoe B which serves to align the edge of the incoming strip or skelp and the edge of the tube. The guide shoe comprises a body 110 formed to provide a pair of guide surfaces 111 and 112 bounded at their inner sides by vertical shoulders or limiting surfaces 113 and 114 respectively. The skelp moves along the surface 111 while the edge of the cylinder moves along and is guided by the surface 112. It will be apparent that the two limiting surfaces or shoulders 113 and 114 are in the same plane (see FIG. 2), and thus the two edges are aligned for the subsequent welding operation. Surface 111 is carried beyond the point of convergence of the surfaces 111 and 112 and extended laterally at 111' to underlie the edge of the tube T, the body having a lateral extension 116 providing surface 111'. The upper portion of the body is extended above and beyond surface 111 to form an arm 117 which terminates in an angularly disposed pair of fingers 118 which resiliently engage the upper surface of the skelp and cylinder respectively, as shown in FIG. 3. A guide wheel 120 of the welding assembly C is shown positioned between the two fingers directly over the abutting edges of the skelp and cylinder, thus serving to orient or position the welding head 122 directly over the seam portion.

It will be noted that where the edge portion of the cylinder has been bent upwardly or outwardly prior to reaching the guide shoe B, as in the region F (FIGS. 2 and 3), as it passes along in contact with the guide surface 112 the extreme edge portion, designated G, is thereby flattened so that it will squarely abut the edge of the skelp in optimum position for butt welding. Accordingly, prior to welding, the edge portion of the tube will have one bend line 125 formed approximately along the region which has passed along the innermost edge of the rollers 68, 70 (FIG. 7), and a second bend line 126 relatively close to the edge 127, as the result of passing through the guide shoe B.

Immediately below the welding assembly C, there is disposed a flux backup assembly D which may be of the type shown and described in United States Patent No. 2,876,934. This may be briefly outlined as consisting of a counterrotating wheel 130 supported in a frame 131 and provided with radially extending brushes and means (not shown) for continuously moving a supply of flux material 132 in countermovement to the sheet metal so as always to have a supply positioned beneath the seam being formed.

From here the welded seam or newly formed tube wall passes over a correspondingly arcuate, copper shoe 135 which is spring-mounted, being urged toward the seam by springs 136 interposed between it and a stationary support 137, guide pins 138 extending between the parts. The copper shoe serves to support and cool the work along the seam area.

It will be apparent from the drawings and the above description that I provide a means and method of readily compensating for unevenness in the length of the edges of the steel strip or skelp in the making of helical, welded seam steel tubing and the like, as where the skelp is cambered as shown in FIG. 4, to produce a substantially cylindrical product such as shown in FIG. 5. It is to be understood in the case of FIG. 4 that the cambered or unevenness in the length of the edges of the strip has been greatly exaggerated, and that, in the case of FIG. 5, the bend at each seam has also been greatly exaggerated for the purpose of illustration. Although I have shown and described a preferred embodiment of the invention it will be apparent that various changes and modifications can be made in the method and apparatus without departing from the scope of the invention which is indicated by the claims which follow.

I claim:

1. In combination with means for longitudinally advancing a strip of skelp along a predetermined path into position to be welded in edge-abutting relation to an end edge of a rotating cylinder being formed or the like, a pair of surface-engaging rollers disposed in general radial alignment on opposite sides of a portion marginal to the edge of said rotating cylinder, said rollers being angularly adjustable relative to the direction of their rotation so as to enable them to be adjusted in a direction to urge said cylinder edge portion toward the adjacent edge of said skelp, and means disposed to limit movement of said cylinder edge portion toward said skelp.

2. The apparatus set forth in claim 1 in which said limit means includes a die formed with a slot opening toward said rollers and adapted slidingly to receive the moving marginal edge portion of the cylinder, said die having an abutment face at the inner end of said slot limiting movement of the cylinder toward said skelp, and in which means is provided for selectively positioning said die radially of the cylinder thereby to provide for selectively bending the marginal edge portion of the cylinder radially.

3. In combination with means for longitudinally advancing a strip of skelp along a predetermined path into position to be welded in edge abutting relation to an end edge of a rotating cylinder or the like, a guide shoe disposed along said path, said guide shoe being formed to provide a pair of longitudinally converging surfaces for the skelp and cylinder edge respectively disposed to progressively position the skelp and cylinder edges together in edge-abutting relation, said guide shoe providing an inner abutment surface for each of said aforementioned surfaces adapted to limit movement of said skelp and said cylinder edge respectively, said abutment surfaces being disposed in a common plane.

4. In combination with means for longitudinally advancing a strip of skelp along a predetermined path into position to be welded in edge abutting relation to an end edge of a rotating cylinder or the like, a curved guide shoe disposed along said path, said guide shoe being formed to provide a pair of longitudinally converging surfaces for the skelp and cylinder edge respectively disposed to progressively position the skelp and cylinder edges together in edge-abutting relation, said guide shoe providing an inner abutment surface for each of said aforementioned surfaces adapted to limit movement of said skelp and said cylinder edge respectively, said abutment surfaces being disposed in a common plane, said guide shoe providing a common supporting surface for one side of said skelp and cylinder edge portion respectively beyond the region of convergence of said converging surfaces, said guide shoe providing a pair of fingers engaging the other side of said skelp and cylinder edge portions, respectively.

5. In combination with means for longitudinally advancing a strip of skelp along a predetermined path into position to be welded in edge-abutting relation to an end edge of a rotating cylinder or the like, a pair of rollers disposed in general radial alignment on opposite sides of said rotating cylinder, means yieldably urging said rollers into firm engagement with the cylinder, said rollers being angularly directed to urge the cylinder edge portion toward the adjacent edge of said skelp, a die formed with a slot opening toward said rollers adapted slidingly to receive said moving cylinder edge, said die having an inner abutment face at the inner end of said slot, said die being adjustably positionable radially of said cylinder whereby to enable bending of the cylinder radially, a curved guide shoe disposed along the path of movement of said skelp and path of rotation of said cylinder edge portion beyond said rollers and said die, said guide shoe providing a pair of longitudinally converging surfaces shaped and positioned to receive the cylinder edge portion and adjacent edge portion of the skelp, respectively, to guide said skelp into edge-abutting relation with said cylinder.

6. A sheet metal edge bending and aligning means, comprising a housing formed with a generally longitudinal slot open at one end and both sides of said housing and adapted to receive an edge portion of sheet metal for movement therethrough from one side to the other of the housing, said housing having a pair of vertical bores in laterally spaced relation intersecting said slot and extending normal to the general plane of the slot, a cylindrical die member axially slidably mounted in the bore closest the inner end of said slot, said die member having a slot therein extending normal to the axis of the die and open at the periphery of the die member for a substantial proportion of the extent of the periphery, the die member being adapted to be disposed within the confines of the slot of said housing and disposed correspondingly thereto whereby to receive the edge portion of the strip of metal, means for adjustably positioning said die member vertically of the slot in the housing whereby to enable said die member to bend the edge portion of said sheet metal at the same passes therethrough, and means mounted in the other of said bores of the housing for engaging opposite sides of the portion of sheet metal received in said slot of said housing for guiding said sheet metal.

7. The construction set forth in claim 6 wherein said last mentioned means comprises a vertically opposed pair of crowd wheel assemblies each embodying a crowd wheel firmly engaging a side of the sheet metal and means for adjustably positioning said rollers in a desired direction.

8. A sheet metal edge-bending and aligning device, comprising a main housing formed with a slot open at one end and both sides of the housing and adapted to receive an edge portion of sheet metal for movement therethrough from one side to the other of the housing, said housing being formed with a bore intersecting said slot adjacent the closed end thereof, said bore having at least one axial keyway, a cylindrical die member axially slidably mounted in said bore and having a transverse slot normal to its axis extending from its periphery inwardly a limited amount, the width of said die slot being less than the width of the housing slot and being contained therein, said die slot facing the open end of said housing slot whereby to receive a moving edge portion of sheet metal extending in the housing slot and into the die slot, a key associated with said die member and received in said keyway for releasably securing said die member in a given position against rotation, said die member having a threaded axial bore, and a threaded pin rotatably mounted on the housing and received in said threaded bore for vertically adjusting said die member.

9. The construction set forth in claim 8 in which said housing is provided with a second bore parallel to the bore containing said die, and in which a pair of opposing rollers is provided in said second bore for engaging opposite sides of the sheet metal.

10. In combination with means for longitudinally advancing a strip of metal along a predetermined path into position to be welded in edge-abutting relation to an end edge of a rotating cylinder, an edge-bending die having a slot adapted to receive therein the edge portion of one of said strips of metal and said cylinder, means for adjusting said jaw transversely of the received edge portion so as to bend the same a given amount, said die being adjustable for varying the extent of possible edge penetration of the strip into said die slot so as to vary the width of the portion of metal bent thereby, edge-engaging roller means for urging the moving edge portion of the strip into said slot, and means subsequently positioned along said path for bending back to a normal position, a narrower band of said bent edge portion so as to position the same for butt-welding.

11. A sheet metal edge-bending and aligning device, comprising a main housing formed with a slot open at one end and both sides of the housing and adapted to receive an edge portion of sheet metal for movement therethrough from one side to the other of the housing, said housing being formed with a bore intersecting said slot adjacent the closed end thereof, a cylindrical die mounted in said bore for adjustment axially thereof, said die having a slot within the slotted area of said housing for reception of the edge portion of sheet metal received in said housing slot, said housing having a threaded bore parallel to the first-mentioned bore, and a pair of opposed roller assemblies in said threaded bore, said roller assemblies each including a roller-mounting yoke means threadedly mounted in the threaded bore, and one of said assemblies including a spring urging the roller thereof toward the other roller.

References Cited in the file of this patent
UNITED STATES PATENTS

| | | |
|---|---|---|
| 1,868,039 | Williams | July 19, 1932 |
| 2,282,176 | Fay et al. | May 5, 1942 |
| 2,567,020 | Kueter | Sept. 4, 1951 |
| 2,776,474 | Melcher | Jan. 8, 1957 |
| 2,787,827 | Karmazin | Apr. 9, 1957 |
| 2,794,409 | Freeze | June 4, 1957 |